US009355763B2

(12) United States Patent
Xu

(10) Patent No.: US 9,355,763 B2
(45) Date of Patent: May 31, 2016

(54) ELECTRONIC PROTECTION COMPONENT

(71) Applicant: Zhonghou Xu, Xiamen (CN)

(72) Inventor: Zhonghou Xu, Xiamen (CN)

(*) Notice: Subject to any disclaimer, the term of this patent is extended or adjusted under 35 U.S.C. 154(b) by 154 days.

(21) Appl. No.: 14/295,351

(22) Filed: Jun. 4, 2014

(65) Prior Publication Data

US 2014/0285941 A1 Sep. 25, 2014

Related U.S. Application Data

(63) Continuation-in-part of application No. 11/792,991, filed on Jun. 13, 2007, now Pat. No. 8,780,521.

(51) Int. Cl.
*H02H 1/00* (2006.01)
*H01C 7/12* (2006.01)

(52) U.S. Cl.
CPC .................................... *H01C 7/126* (2013.01)

(58) Field of Classification Search
USPC ..................................................... 361/127
See application file for complete search history.

(56) References Cited

U.S. PATENT DOCUMENTS 6,211,770 B1* 4/2001 Coyle .................... H01C 7/126 338/101
6,252,754 B1* 6/2001 Chaudhry ................ H02H 9/06 361/111
6,819,215 B2* 11/2004 Tanaka ................. H01H 37/761 337/160
8,780,521 B2* 7/2014 Xu ........................... H01C 7/10 361/124
2002/0054465 A1* 5/2002 Gerlach .................... H01T 4/06 361/111
2003/0043519 A1* 3/2003 Wu ........................ H02H 9/042 361/91.1
2014/0285941 A1* 9/2014 Xu ......................... H01C 7/126 361/127

FOREIGN PATENT DOCUMENTS

CN 2457706 Y 10/2001
CN 2535906 Y 2/2003

* cited by examiner

*Primary Examiner* — Ronald W Leja

(57) ABSTRACT

An electronic protection component comprises an outer case bounding an outer cavity therein; a varistor with a first varistor lead connected to a first varistor electrode and a second varistor lead connected to a second varistor electrode, wherein the varistor is placed in the outer cavity; a low melting point alloy wire with a first thermal fuse lead in one end and a second thermal fuse lead in the other end; wherein either the first thermal fuse lead or the second fuse lead is connected to either the first varistor electrode or the second varistor electrode therefore forming a lead junction.

13 Claims, 7 Drawing Sheets

ELECTRONIC PROTECTION COMPONENT

CROSS-REFERENCE TO RELATED APPLICATIONS

This application is a continuation-in-part application of Ser. No. 11/792,991, filed Jun. 13, 2007, which is incorporated herein by reference.

TECHNICAL SCOPE

The invention relates to a varistor with built-in alloy-type thermal fuse with thermal failure protection which is particularly applied to zinc oxide varistor and used for over-voltage protection.

BACKGROUND OF THE INVENTION

A varistor is broadly used as an over-voltage protection component and surge absorption component for circuit, equipment and components because of its non-linear volt-ampere character. Irrespective whether the varistor is used in power circuitry or electrical circuitry, if transient over-voltage happens frequently, the varistor will operate frequently to protect electrical equipment and components by suppressing the amplitude of the over-voltage, absorbing and releasing the surge power. However, the frequent operation will inevitably cause the performance degradation of a conventional varistor, even cause the varistor to lose its effectiveness. Therefore, when the conventional varistor suffers transient over-voltage, it will rapidly get partial breakdown therefore potentially cause fire. The conventional varistor with thermal protection has the following disadvantages: firstly, the conventional varistor with thermal protection has a complex structure such as a traditional module-type varistor with thermal trip device or a thermally protected varistor disclosed in Chinese patent number CN02222055.0, published on Feb. 12, 2003; secondly, conventional varistor with thermal protection has slow response rate of over-heat protection; furthermore the conventional varistor does not have the ability to handle and to withstand large amount of current impact and as a result it may easily lose its effective circuit protection. Such as a traditional flake-type varistor with thermal trip device, or a varistor which is connected externally with an organic-type or alloy-type thermal fuse as disclosed in Chinese patent number CN00237913.9, published on Oct. 31, 2001.

SUMMARY OF THE INVENTION

The objective of the invention is to provide a varistor with a built-in alloy-type thermal fuse which has simple compact structure, rapid response and wide application.

The principle of the invention is to incorporate or integrate the varistor and the thermal fuse to form a varistor with self-failure protection utilizing the advantage of an alloy-type thermal fuse.

The principle of the invention is to incorporate the varistor and the thermal fuse to form a varistor with self-failure protection utilizing the advantage of an alloy-type thermal fuse.

The invention can be implemented as follows: it comprises a varistor, an alloy-type thermal fuse and a closed cavity. The varistor and alloy-type thermal fuse are placed in parallel in the closed cavity with a surface of the varistor attached or close to a surface of the alloy-type thermal fuse. Their leads are extended to the outside of the closed cavity which may or may not be filled with an alloy melting promoting agent.

The closed cavity includes an outer case with an opening. The varistor and alloy-type thermal fuse are placed in the outer case which may or may not be filled with the alloy melting promoting agent. The opening on the upward of the outer case is filled in with a seal material of epoxy resin to form the closed cavity.

In another embodiment: it comprises a varistor, an alloy-type thermal fuse and a closed cavity. The alloy-type thermal fuse is disposed in an inner case; the inner case and the varistor are placed in a closed cavity and with one surface of each attached to or close to each other. The leads are extended to the outside of the cavity which may or may not be filled with the melting promoting agent such as resin.

The closed cavity may comprise an outer case with an opening. The front wall of the outer case extends to the outside to form a raised part for accommodating the inner case. The opening of the outer case is sealed with seal materials of epoxy resin to form the closed cavity.

The alloy-type thermal fuse may be a low melting point alloy wire with leads in its two ends.

The inner case may be made of ceramic or other material of high heat conductivity and high electrical insulation. At least one side wall of the inner case should be smooth. The thermal fuse may be located in the inner case which is made of ceramic or other material of high heat conductivity and high electrical insulation. This arrangement can save the material of melting promoting agent and prevent heat dispersal. It also has an arc-extinguish function and at the same time improves electrical insulation.

In another embodiment, it comprises a varistor, an alloy-type thermal fuse and a closed cavity. The alloy-type thermal fuse and the varistor are placed in a closed. cavity and with one surface of each attached to or close to each other. One lead of the alloy-type thermal fuse is connected to one electrode of the varistor to transfer the heat from the varistor to the thermal fuse faster. The second electrode of the varistor is connected to a lead which extends the outside of the closed cavity.

In another embodiment, it comprises a varistor, a low melting point alloy wire with leads in its two ends and a closed cavity. The low melting point alloy wire is located in an inner case. The inner case is filled with a melting promoting agent. One surface of the inner case is either attached to the surface of the varistor or is close to the surface of the varistor. One lead of the low melting point alloy wire is connected to one electrode of the varistor to transfer the heat from the varistor to low melting alloy wire faster. The second electrode of the varistor is connected to a lead which extends the outside of the closed cavity. The other lead of low melting alloy wire is also extended to the outside of the closed cavity.

In another embodiment, it comprises a varistor, a low melting point alloy wire with leads in its two ends and a closed cavity. The low melting point alloy wire is located close to the varistor. One lead of the low melting point alloy wire is connected to one electrode of the varistor to transfer the heat from the varistor to low melting alloy wire faster. The second electrode of the varistor is connected to a lead which extends the outside of the closed cavity. The other lead of low melting alloy wire is also extended to the outside of the closed cavity.

The electronic protection component with different structures can be made according to the requirements of the circuit on the basis of the above basic structure. Alternate structures are illustrated as below.

Thermally Protected Varistors with Two Leads

One lead of the alloy-type thermal fuse is connected with a lead of the varistor and the connecting point is sealed in the outer case. Another lead of alloy-type thermal fuse and another lead of the varistor respectively extend to the outside of the closed cavity.

In another structure one lead of the alloy-type thermal fuse is connected to one of the two electrodes of the varistor and the connecting point is sealed in the enclosed cavity. The other lead of alloy-type thermal fuse and another lead of the varistor respectively extend to the outside of the closed cavity.

In yet another two leads structure, low melting point alloy wire with leads in its two ends and a varistor are placed in a closed cavity. The low melting point alloy wire is placed in a inner case. The inner case is filled with a melting promoting agent. One surface of the inner case is either attached to the surface of the varistor of is close to the surface of the varistor. One lead of the low melting point alloy wire is connected to one electrode of the varistor to transfer the heat from varistor to low melting alloy wire faster. The second electrode of varistor is connected to a lead which extends the outside of the closed cavity. The other lead of low melting alloy wire is also extended to the outside of the closed cavity.

Thermally Protected Varistors with Three Leads

Two leads are connected to two electrodes of the varistor and both leads of the varistor extend to the outside of the cavity. One lead of the varistor which is close to the thermal fuse is connected with one lead of the alloy-type thermal fuse and the connecting point is sealed in the outer case. Another lead of the alloy-type thermal fuse extends to the outside of the cavity.

Two leads are connected to the two electrodes of the varistor. Both leads of the varistor extend to the outside of the cavity. One lead of the thermal fuse is connected to one of the two electrodes of the varistor and the connecting point is sealed in the enclosed cavity. Another lead of the alloy-type thermal fuse extends to the outside of the cavity.

In yet another three leads structure, low melting point alloy wire with leads in its two ends and a varistor are placed in a closed cavity. The low melting point alloy wire is placed in an inner second case. The inner case is filled with a inching promoting agent. One surface of the inner case is either attached to the surface of the varistor or is close to one of the surfaces of the varistor. One lead of the low melting point alloy wire is connected to one electrode of the varistor to transfer the heat from varistor to low melting alloy wire faster. The first electrode of varistor is connected to a lead which extends to the outside of the closed cavity. The second electrode of varistor is connected to a lead which extends the outside of the closed cavity. The other lead of low melting alloy wire is also extended to the outside of the closed cavity.

Thermally Protected Varistors with Four Leads

Two leads of the alloy-type thermal fuse and two leads of the varistor extend to the outside of the cavity. The leads are not connected with each other.

Thermally Protected Varistors Connected in Series

There are two varistors mounted in the outer case. Two leads of the alloy-type thermal fuse which is sandwiched between the two varistors are respectively connected with one lead of two corresponding varistors. The connecting points are sealed in the outer case. Two varistors are connected in series through the thermal fuse. Their other leads respectively extend to the outside of the closed cavity.

Thermally Protected Varistors in Parallel Connection

There are two varistors mounted in the cavity. After the opposite leads of the corresponding varistors are connected with each other, then connected with a lead of the alloy-type thermal fuse, the connecting point is sealed in the outer case. The two varistors are connected parallel with each other. The alloy-type thermal fuse is sandwiched between the varistors. Another two leads of the varistors and the other lead of the alloy-type thermal fuse respectively extend to the outside of the closed cavity.

Thermally Protected Varistor with Alarm Function

An alarm contacts with temperature control can be placed beside the alloy-type thermal fuse and the varistor in the closed cavity. There are two alarm modes: one is from normally open to normally closed and the other is from normally closed to normally open.

Thermally Protected Varistor with the Function of Starting up a Backup Varistor

A switch which can contacts with temperature control and has an operation mode of from normally open to normally closed, and the switch is placed beside the varistor and the alloy-type thermal fuse which are disposed in the closed cavity. The backup varistor and the switch are linked in the circuit after being connected in series. When the operation mode of the switch is turned from normal open to normally closed, the backup varistor can be connected with the circuit and start its formal work immediately. It is also possible to enable the backup varistor with a function of starting up a next backup varistor.

Alternatively, the electronic protection component can be made with other structures. For examples, there may be more than two varistors connected in series or in parallel.

In the present invention, the varistor and the thermal fuse are integrated so that the speed of heat transfer is faster and the installation is convenient when in use. Under the action of the melting promoting agent, the melted alloy of the thermal fuse shrinks rapidly toward the two leads and agglomerates to form two balls of the melted alloy on the two leads. The melting promoting agent is also called a "flux", and according to the present invention it may especially be resin. Alloys of different melting points and sizes may be chosen for the thermal fuse to match the varistors of different peak current according to different requirements.

The present invention has many advantages. First of all, the present invention can satisfy the requirements of varistors with different peak current and different varistor voltage to absorb the over-voltage of lightning strike and surge voltage. Secondly when the varistor operates to suppress over-voltage frequently, absorb and release surge energy will cause the performance degradation of the varistor or lose effectiveness. The various structures as disclosed in the present invention can have the function of starting up a failure protection when the leakage current of the varistor is lower than 10 milli-ampere (it also can start up failure protection when the leakage current of the varistor is lower but it will slightly reduce the peak current accordingly). Thirdly, when the varistor withstands transient over-voltage and the leakage current of the varrister is lower than 300 milli-ampere, the various structures of the present invention can start up a failure protection before the breakdown of the varistor. However, if the leakage current of the varistor is over 10 ampere, the various structures of the present invention can start up the failure protection rapidly after the breakdown of the varistor]. Fourthly, the various structures of the invention can promote absorption and release of the surge energy.

Figure 1A:
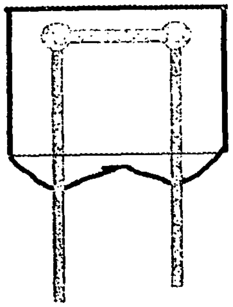
FIG. 1A: The drawing before thermal fuse opening.

Reference numerals: 1. outer case; 2. varistor; 3. leads of varistor; 4. alloy-type thermal fuse; 5. leads of thermal fuse; 6. seal material of epoxy resin; 7. alloy melting promoting agent; 8. inner case; 9. alarm; 10. switch; 11. raised section; 12. low melting alloy wire; 13. second raised section; 14. second inner case; 15. thermal switching element.

DETAILED DESCRIPTION OF EXAMPLE EMBODIMENTS OF THE INVENTION

Figure 2A:
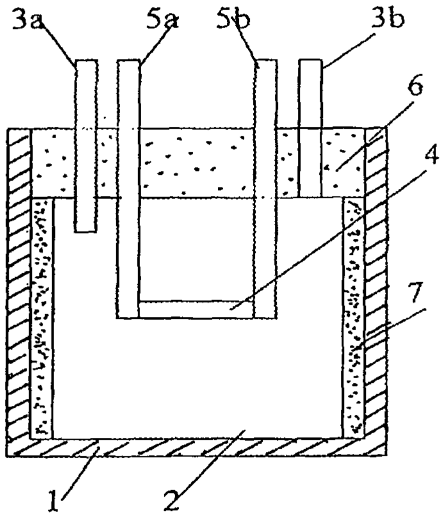
FIG. 2A: The drawing of the basic structure of a first embodiment.

Embodiment 1:

Shown in FIG. 2A is the drawing of the basic structure of the first embodiment which comprises outer case 1, varistor 2 and alloy-type thermal fuse 4. Varistor 2 and alloy-type thermal fuse 4 are placed in outer case 1 with the surface of varistor 2 being attached to the surface of alloy-type thermal fuse 4. Outer case 1 is filled with alloy melting promoting agent 7. The opening of outer case 1 is sealed with epoxy resin 6 to form a closed cavity. Leads 3 of varistor 2 and leads 5 of thermal fuse 4 are extended to the outside of outer case 1.

Figure 1B:
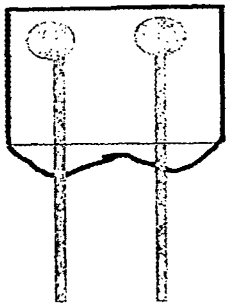
FIG. 1B: The drawing after the thermal fuse has opened, showing the melted alloy shrunk to two balls under the influence of the melting promoting agent.

When the electronic protection component is in use, when varistor 2 is heated by various causes, the heat is transferred firstly to the surrounding alloy melting promoting agent 7 from the surface of varistor 2 and then is transferred from melting promoting agent 7 to alloy-type thermal fuse 4 until the alloy is melted due to the heat and balls-up and shrinks towards two leads 5*a* and 5*b* of thermalfuse 4 rapidly under the influence of alloy melting promoting agent 7 (as shown in the transition from FIG. 1A to FIG. 1B), so as to switch off the circuit. Namely, thermal fuse 4 is cut-off or opened, so that varistor 2 will be separated from the circuit.

Figure 2B:
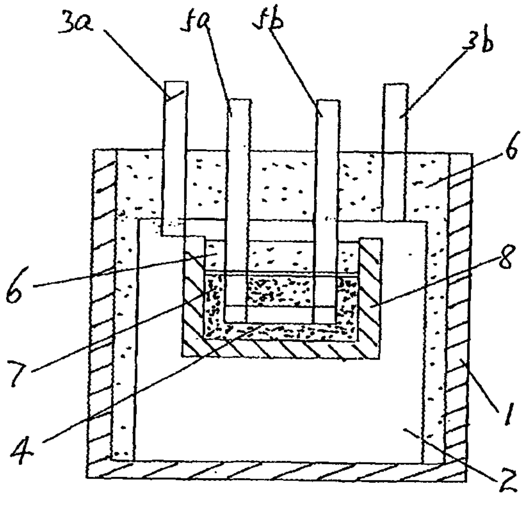
FIG. 2B: The drawing of the basic structure of a second embodiment.

Embodiment 2:

Shown in FIG. 2B, is the base structure of the second embodiment which comprises varistor 2, alloy-type thermal fuse 4, outer case 1 and inner case 8. Alloy-type thermal fuse 4 and melting promoting agent, e.g. resin 7 are placed in inner case 8 which is made of ceramic or other material of high heat conduction and high electrical insulation, the opening of inner case 8 is sealed with epoxy resin 6, and the inner surface of the inner case 8 is attached to one surface of varistor 2. Then inner case 8 and varistor 2 are placed in outer case 1 with the opening of outer case 1 being sealed with epoxy resin 6 to form a closed cavity.

When varistor 2 is heated by various causes, heat is directly transferred from the surface of varistor 2 to inner case 8, and then the heat is immediately transferred to alloy-type thermal fuse 4 until the alloy is melted after heating, and thereby the melted alloy shrinks rapidly toward two leads 5*a* and 5*b* of thermal fuse 4 under the influence of alloy melting promoting agent 7, so that the circuit is cut of The damaged or defective overheating varistor 2 will thereby be separated from the circuit.

Figure 3A:
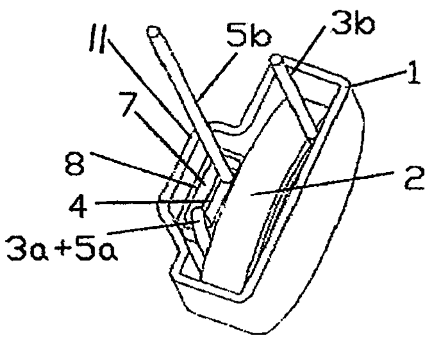
FIG. 3A: The structure drawing of an application with two leads.
Figure 3B:
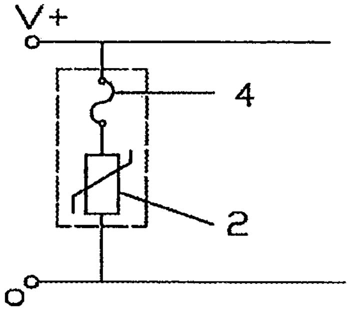
FIG. 3B: The circuit drawing of FIG. 3A.

Embodiment 3:

Shown in FIGS. 3A and 3B, is an embodiment with two leads, which comprises varistor 2, alloy-type thermal fuse 4, outer case 1 and inner case 8. The front wall of outer case 1 extends to the outside to form a raised section 11 for accommodating inner case 8 therein. Alloy-type thermal fuse 4 and melting promoting agent such as resin 7 are placed in inner case 8 which is made of ceramic or other material of high heat conduction and high electrical insulation. The opening of inner case 8 is sealed with epoxy resin 6 with the inner surface of inner case 8 attached to one surface of varistor 2. Inner case 8 and varistor 2 are placed in outer case 1 (as shown in FIG. 2B). First lead 3*a* of varistor 2 is connected with second lead 5*a* of alloy-type thermal fuse 4 and enclosed in the case. Second lead 3*b* of varistor 2 and first lead 5*b* of alloy-type thermal fuse 4 respectively extend to the outside of outer case 1. The opening of outer case 1 is sealed with epoxy resin 6 to form a closed cavity.

Figure 4A:
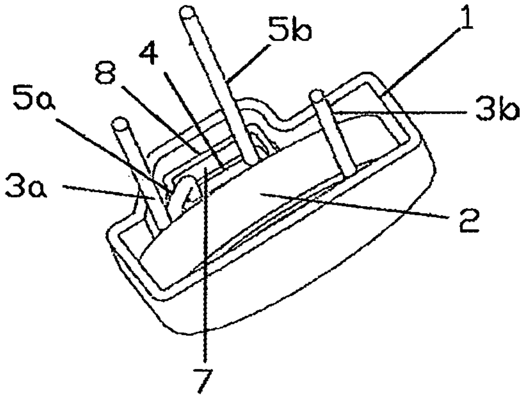
FIG. 4A: The structure drawing of an application with three leads.
Figure 4B:
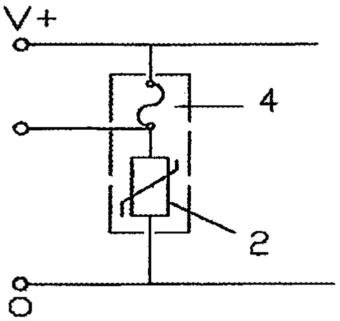
FIG. 4B: The circuit drawing of FIG. 4A.

Embodiment 4:

Shown in FIGS. 4A and 4B, it is the drawing of an embodiment with three leads. The difference from embodiment 3 is that two leads 3*a* and 3*b* of the varistor extend to the outside of the cavity. One lead 3*a* is connected with one lead 5*a* of alloy-type thermal fuse 4. The connecting point is sealed in outer case 1. Another lead 5*b* of alloy-type thermal fuse 4 extends to the outside of outer case 1. The opening of outer case 1 is sealed with epoxy resin 6.

Figure 5:
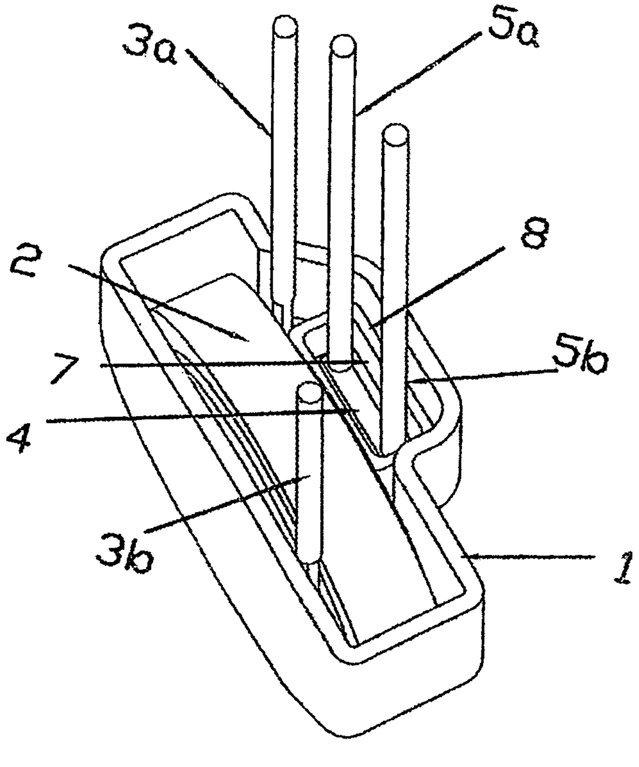
FIG. 5: The structure drawing of an application with four leads.

Embodiment 5:

Shown in FIG. 5, it is the drawing of an application with four leads. The difference from embodiment 3 is that leads 3*a* and 3*b* of varistor 2 and leads 5*a* and 5*b* of the alloy-type thermal fuse 4 all extend to the outside of outer case 1. The leads are not connected to each other. The opening of outer case 1 is sealed with epoxy resin 6.

Figure 6A:
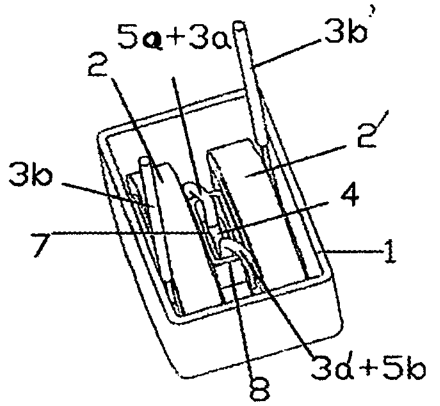
FIG. 6A: The structure drawing of an application with two varistors in series.
Figure 6B:
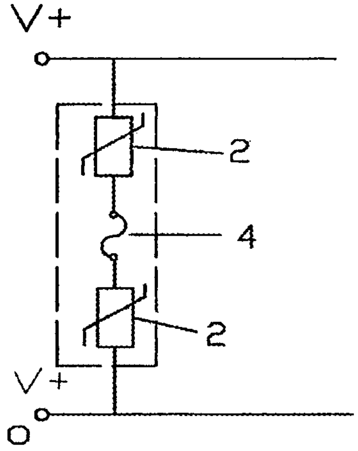
FIG. 6B: The circuit drawing of FIG. 6A.

Embodiment 6:

Shown in FIGS. 6A and 6B, the embodiment for two varistors in series comprises two varistors 2 and 2', and alloy-type thermal fuse 4, outer case 1 and inner case 8. Outer case 1 is rectangular. Alloy-type thermal fuse 4 and melting promoting agent such as resin 7 are installed into inner case 8 whose opening is sealed with epoxy resin 6. Inner case 8 is sandwiched between varistors 2 and 2'. One external surface of inner case 8 is attached to one surface of first varistor 2. Another external surface of inner case 8 is attached to one surface of second varistor 2'. They are placed into outer case 1. One lead 5*a* of alloy-type thermal fuse 4 is connected with one lead 3*a* of first varistor 2. Another lead 5*b* of alloy-type thermal fuse 4 is connected with one lead 3*a'* of second varistor 2'. They are closed in outer case 1. First varistor 2 and second varistor 2' are connected in series.

Another lead 3*b* of first varistor 2 and another lead 3*b'* of second varistor 2' respectively extend to the outside of outer case 1. The opening of outer case 1 is sealed with epoxy resin 6. This series-connected application utilizes the addition effect of voltages of two varistors. When a single varistor has difficulty meeting the demand of a higher varistor voltage, it will be undertaken by two series-connected. varistors with lower varistor voltages and at the same time it has a function of failure protection.

Figure 7A:
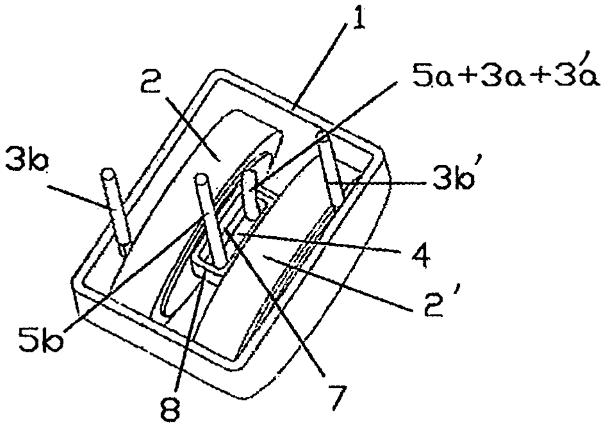
FIG. 7A: The structure drawing of an application with two varistors in parallel.
Figure 7B:
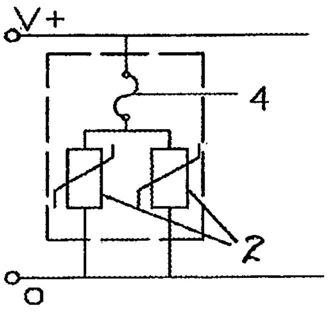
FIG. 7B: The circuit drawing of FIG. 7A.

Embodiment 7:

Shown in FIG. 7A and 7B is the drawing of an embodiment with two varistors connected in parallel comprising varistors 2 and 2', alloy-type thermal fuse 4, outer case 1 and inner case 8. The difference from embodiment 6 is that one lead 3*a* of first varistor 2 is connected with one lead 3*a*' of second varistor 2' then connects with one lead 5*a* of alloy-type thermal fuse 4 which is sandwiched between two varistors 2, 2', connected in series. Another lead 3*b* of first varistor 2 and another lead 3*b*' of second varistor 2' and another lead 5*b* of alloy-type thermal fuse 4 respectively extend to the outside of outer case 1. The opening of outer case 1 is sealed with epoxy resin 6. This embodiment can increase peak current while keeping the varistor voltage stable, it has a function of failure protection at the same time.

According to the principles of embodiments 6 and 7, it is possible to make more than two varistors connected in series or parallel and so on.

Figure 8A:
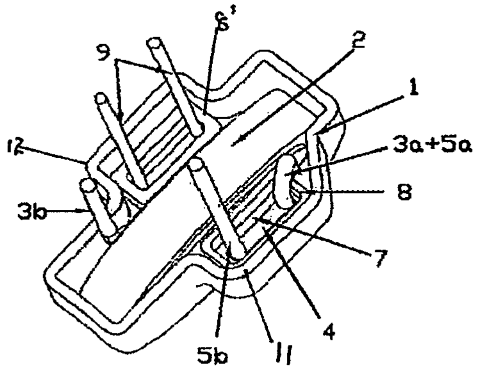
FIG. 8A: The structure drawing of an application with alarm function.
Figure 8B:
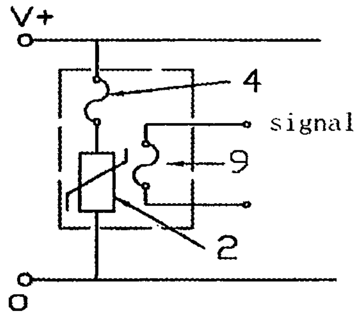
FIG. 8B: The circuit drawing of FIG. 8A.

Embodiment 8:

FIG. 8 is the embodiment with alarm function, based on the structures of embodiment 2 to embodiment 7. It is possible to place alarm 9 contacts with temperature control t beside alloy-type thermal fuse 4. There are two operation modes: one is from normally open to normally closed, the other one is from normally closed to normally open. Alarm 9 can control a connected indication light to be on or off to realize the alarm function.

As shown in FIG. 8, the drawing of the single varistor with alarm function comprises varistor 2, alloy-type thermal fuse 4, outer case 1 and inner cases 8 and 8'. The front wall and the rear wall of outer case 1 respectively extend to the outside to form raised sections 11 and 12 for respectively accommodating the inner cases 8 and 8'. Alloy-type thermal fuse 4 and alloy melting promoting agent 7 are installed into inner case 8 whose opening is sealed with epoxy resin 6. The alarm with temperature control is installed into another inner case 8'. The inner surface of inner case S is attached to the surface of varistor 2. The inner surface of inner case 8' is attached to another surface of varistor 2. Two inner cases 8 and 8' and varistor 2 are all placed. into outer case 1 whose opening is sealed with epoxy resin 6.

Figure 9:
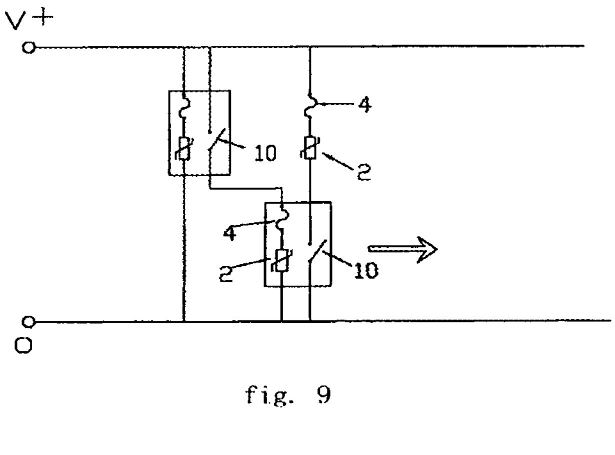
FIG. 9: The circuit drawing of an application with the function of starting up a backup varistor.

Embodiment 9:

Shown in FIG. 9, it is the circuit drawing of the embodiment with a function of starting up a backup varistor. Based on the structures of embodiment 2 to embodiment 7, it is possible to place temperature controlled switch 10 which has an operation mode of from normally open turning to normally closed beside alloy-type thermal fuse 4. Switch 10 can have parallel connection in circuitry after connecting with a backup varistor in series (as the structure of embodiments 1 to 8). When the temperature of varistor 2 is up to an appointed temperature, the second varistor will start to work and realize multilevel backup varistors. The embodiments 7 and 8 can be operated at the same time.

In embodiments 3 to 8, when varistor 2 is heated by various causes, heat is transferred from the varistor by contact conduction to inner case 8 which is made of ceramic of another material of good thermal conductivity and electrical insulation. Further the heat is transferred to alloy-type thermal fuse 4 and alloy melting promoting agent 7 through the leads 5. The thermal fuse's alloy is melted after heating and shrinks rapidly toward the two leads of alloy-type thermal fuse 4 under the influence of alloy melting promoting agent 7 so as to cut off the circuit. Varistor 2 will be separated from the circuit. This design has a quick response to heat and it has an easy to assemble and compact structure.

With regard to embodiments 1 to 7, it is possible to solder leads 3*a* and 3*b* respectively on two silver layers of a bare disc of a sintered varistor. The finished product which is sealed with epoxy resin powder is placed in the closed cavity and mates or fits with alloy-type thermal fuse 4. Another method is to firstly solder a round sheet of copper on one-side of a silver layer of the bare disc of the sintered varistor and then solder lead 3*b* on the round sheet of copper; while another silver layer can be provided as lead 3*a* and is placed into outer case 1 after being connected with alloy-type thermal fuse 5*a*. A seal inside outer case 1 and other spacing parts are filled and sealed with epoxy resin.

More embodiments are presented to show the connecting of the thermal fuse lead and the varistor.

Embodiment 10:

The electronic protection component comprises outer case 1, inner case 8, varistor 2, low melting point alloy wire 12, alloy melting promoting agent 7, an epoxy resin. The basic structure is also illustrated in FIGS. 2A-2B.

Outer case 1 bounds an outer cavity, which may or may not be completely filled with alloy melting promoting agent 7. Varistor 2 is placed in the outer cavity, with first varistor lead 3*a* connected to first varistor electrode 3c . and second varistor lead 3*b* connected to a second varistor electrode 3d. In this embodiment, low melting point alloy wire 12 is used as a thermal fuse, comprising first thermal fuse lead 12*a* in one end and second thermal fuse lead 12*b* in the other end. The material of thermal fuse is not limited to low melting point alloy wire. Low melting point alloy wire 12. is placed in an inner cavity of inner case 8, and could be placed in close proximity of varistor 2. Inner case 8 is arranged within outer case 1 and hounds the inner cavity, which is completely filled with alloy melting promoting agent 7.

Alloy melting promoting agent 7 is filled into the inner cavity such that alloy inciting promoting agent 7 surrounds and contacts low melting point alloy wire 12 in the inner cavity. Alloy melting promoting agent 7 is a flux that has an effect of causing low melting point alloy wire 12 to melt, and the flux can increase the surface tension of the liquid alloy when low melting point alloy wire 12 melts, to shrink together and agglomerate to form two balls of low melting point alloy wire 12 respectively on two thermal fuse leads 12*a*, 12*b* . The material of alloy melting promoting agent 7 is resin.

The epoxy resin seals the opening of outer case 1 so as to enclose and seal the outer cavity with varistor 2 and inner case 8 therein, and with at least two of leads (3*a*, 3*b*, 12*a*, and 12*b*) extending out of outer case 1 through the epoxy resin.

Figure 10:
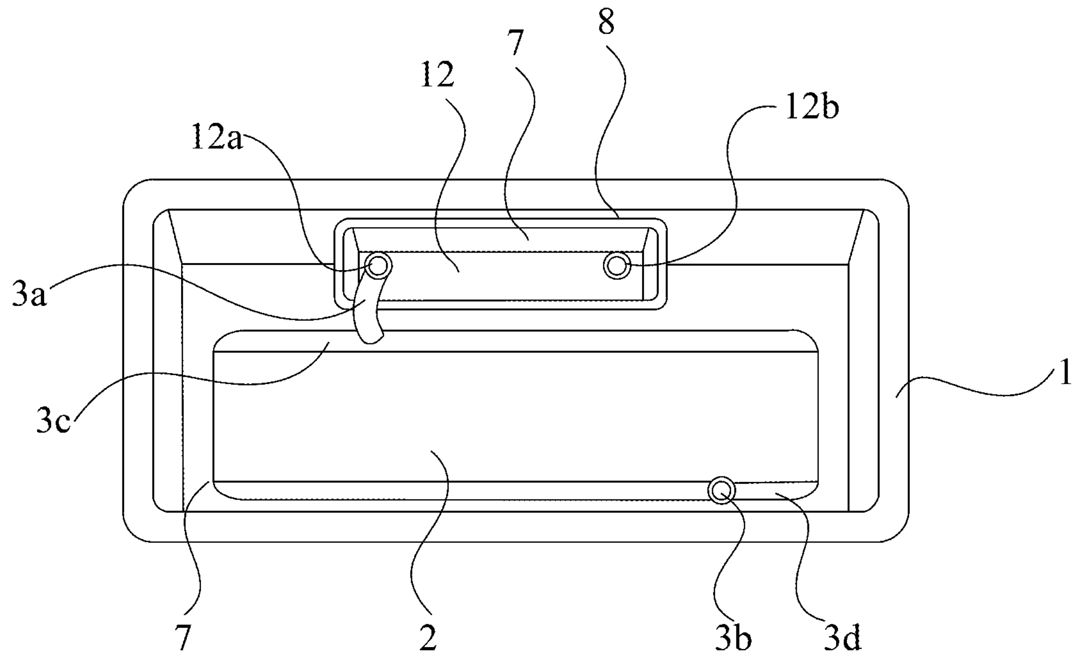
FIG. 10: The schematic structure of embodiment 10 of the present invention.

Either first thermal fuse lead 12*a* or second thermal fuse lead 12*b* is connected to either first varistor electrode 3*c* or second varistor electrode 3*d* therefore forming a lead junction. One of the two varistor electrodes (3*c*, 3*d*) is connected directly to one of said two thermal fuse leads (12*a*, 12*b*) at a lead junction within outer case 1. The lead junction is enclosed and sealed under the epoxy resin within outer case 1 for shortening the distance of heat conduction. For example, a kind of lead junction is illustrated in FIG. 10, first lead 3*a* is connected to a first terminal one of thermal fuse lead 12*a* at a lead junction within outer case 1, second lead 3*b* of the varistor leads extends out of outer case 1 forming a first lead, and the second terminal of thermal fuse leads (12*a*, 12*b*) extends out of outer case 1 forming a second lead, the lead junction is connected to a third lead outside of outer case 1 and no more than three of the leads extend out of outer case 1 through the epoxy resin.

Embodiment 11:

In embodiment 11, the difference compared to embodiment 10 is that the electronic protection component further comprises raised section 11 created by extending the front wall of outer case 1. In that case, inner case 8 has a flat side wall and arranged in raised section 11 of the outer cavity with the flat side wall in flat planar surficial contact with a surface of varistor 2.

Figure 11:
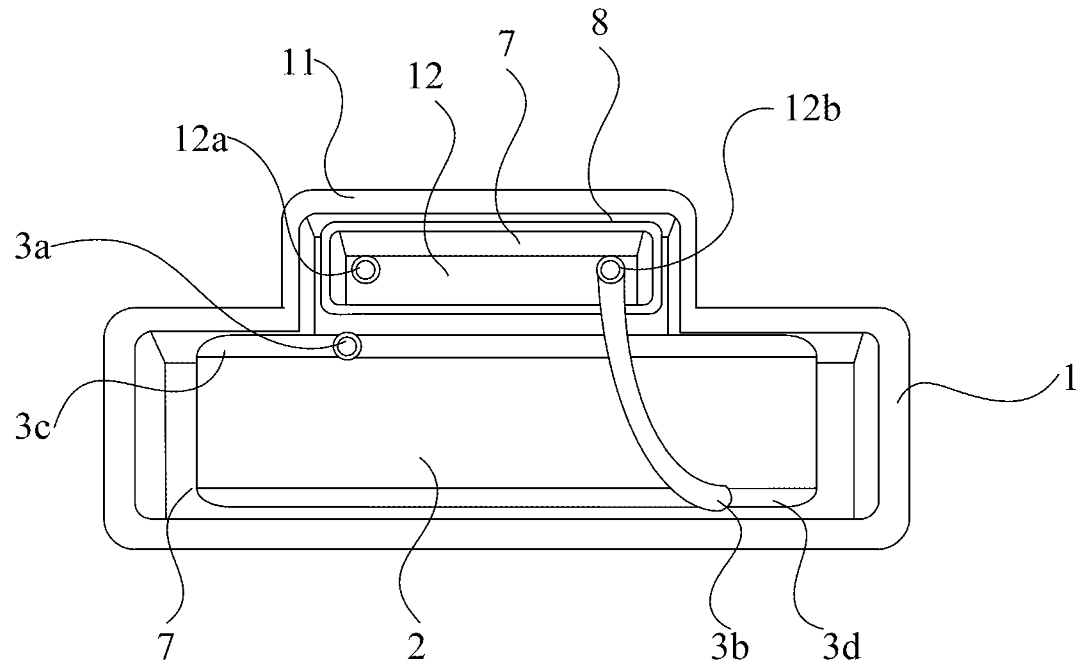
FIG. 11: The schematic structure of embodiment 11 of the present invention.

Another kind of lead junction is illustrated in FIG. 11, second lead 3*b* is connected to a first terminal one of thermal fuse lead 12*b* at a lead junction within outer case 1, first lead 3*a* of the varistor leads extends out of outer case 1 forming a first lead, and the second terminal of thermal fuse leads (12*a*, 12*b*) extends out of outer case 1 forming a second lead, the lead junction is connected to a third lead outside of outer case 1 and no more than three of the leads extend out of outer case 1 through the epoxy resin.

Figure 12:
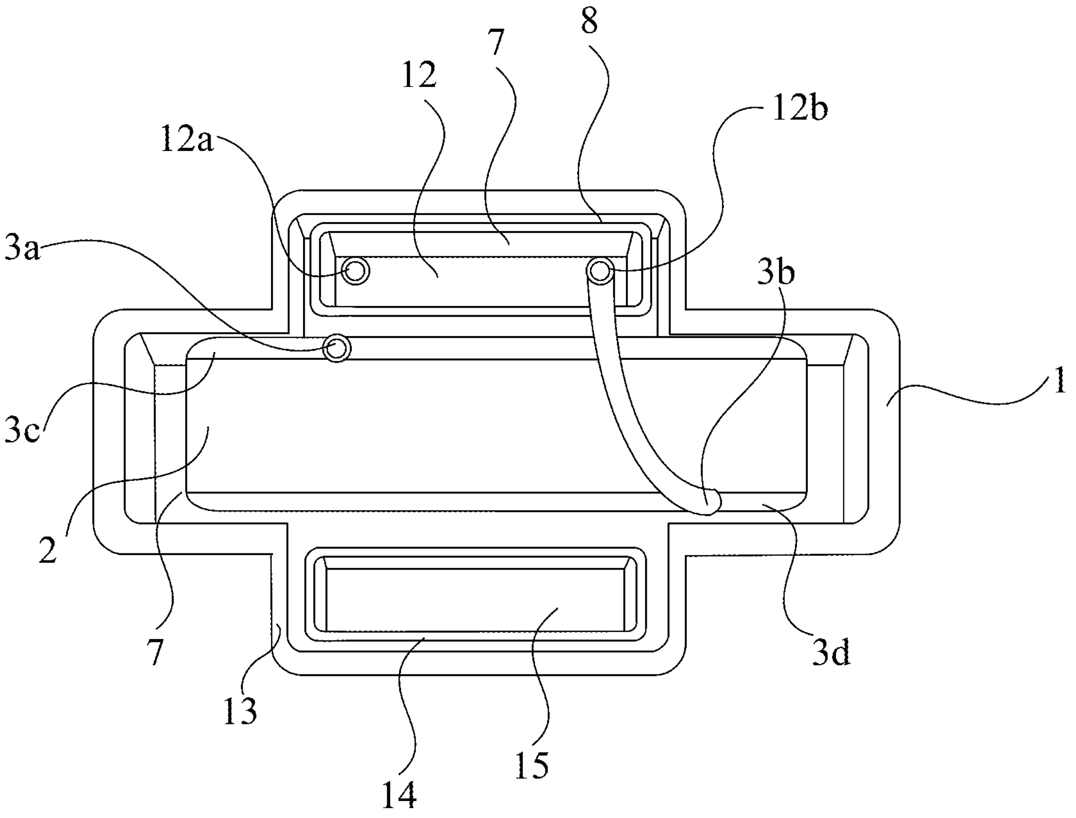
FIG. 12: The schematic structure of embodiment 12 of the present invention

Embodiment 12:

In embodiment 12, as illustrated in FIG. 12, the difference compared to embodiment 11 is that the electronic protection component further comprises second raised section 13 created by extending a second longitudinal wall (such as rear wall) of outer case 1. Second inner case 14 bounds a second inner cavity therein and second inner case 14 is located in second raised section 13 within outer case 1. And the embodiment further comprise thermal switching element 15 for an alarm indicator circuit arranged in second inner cavity. In this case, second inner case 14 has a second flat longitudinal side wall and is arranged in the outer cavity with the second flat longitudinal side wall in flat planar surficial contact with a second surface of varistor 2 opposite inner case 1 with fuse 12 therein.

The electronic protection component of the present invention is capable of transferring heat from varistor 2 to the low melting point alloy wire by combination of contact between varistor 2 and inner case 8 and through the lead junction and through one of the thermal fuse leads (5*a*, 5*b*) that is connected to the lead junction

I claim:

1. An electronic protection component comprising:

an outer case bounding an outer cavity therein;

a varistor with a first varistor lead connected to a first electrode and a second varistor lead connected to a second varistor electrode, wherein the varistor is placed in the outer cavity;

a low melting point alloy wire with a first thermal fuse lead in one end and a second thermal fuse lead in the other end;

wherein the low melting point alloy wire is placed in an inner case and the inner case is placed within the outer case; the inner case is placed in close proximity of the varistor.

2. The electronic protection component of claim 1, wherein either the first thermal fuse lead or the second thermal fuse lead is connected to either the first varistor electrode or the second varistor electrode therefore forming a lead junction.

3. The electronic protection component of claim 2, wherein the inner case is filled with an alloy melting promoting agent.

4. The electronic protection component of claim 2, wherein an epoxy resin seal seals an opening of said outer case so as to enclose and seal the outer cavity with the varistor and the inner case therein, and with at least two of the leads extending out of the outer case through the epoxy resin.

5. The electronic protection component of claim 4, wherein the electronic protection component is capable of transferring heat from the varistor to the low melting point alloy wire by combination of contact between the varistor and the inner case and through the lead junction and through one of the thermal fuse leads that is connected to the lead junction.

6. The electronic protection component of claim 1, wherein an epoxy resin seals an opening of said outer case so as to enclose and seal the outer cavity with the varistor and the inner case therein, and with at least two of the leads extending out of the outer case through the epoxy resin seal.

7. The electronic protection component of claim 1, wherein the inner case is filled with an alloy melting promoting agent.

8. An electronic protection component comprising:

an outer case bounding an outer cavity therein;

a first varistor with a first lead of the first varistor connected to a first varistor electrode and a second lead of the first varistor connected to a second varistor electrode;

a second varistor with a first lead of the second vanstor connected to a first electrode of the second varistor and a second lead of the second varistor connected to a second electrode of the second varistor;

a low melting point alloy wire with a first thermal fuse lead in one end and a second thermal fuse lead in the other end;

wherein the first varistor and the second varistor are all placed in the outer cavity; the low melting point alloy wire is placed in an inner case and the inner case is placed within the outer case; the inner case is laminated between the first varistor and the second varistor and is in close proximity of the first varistor and the second varistor; an epoxy resin seals an opening of said outer case so as to enclose and seal the outer cavity with the varistor and the inner case therein.

9. The electronic protection component of claim 8, wherein the first thermal fuse lead electrically connects with the first lead of the first varistor, the second thermal fuse lead electrically connects with the first lead of the second varistor; the second lead of the first varistor and the second lead of the second varistor extend out through the epoxy resin; the first varistor, the low melting point alloy wire and the second varistor are in serial connection with each other.

10. The electronic protection component of claim 8, wherein the first thermal fuse lead electrically connects with the first lead of the first varistor, the second lead of the first varistor and the second thermal fuse extending out from the epoxy resin; the first lead of the second varistor electrically connects with the first lead of the first varistor and the second lead of the second lead of second varistor electrically connects with the the first varistor and the first varistor and the second varistor are in parallel with each other and then in serial connection with the low melting point alloy wire.

11. The electronic protection component of claim 8, wherein an alloy melting promoting agent is filled into the inner case such that the alloy melting promoting agent surrounds and contacts the low point melting alloy wire in the inner case.

12. The electronic protection component of claim 11, wherein the alloy melting promoting agent is a flux that has an effect of causing the low point melting alloy wire to melt, and the flux can increase the surface tension of the liquid alloy when the low point melting alloy wire melts, to shrink together and agglomerate to form two balls of said alloy thermal fuse material respectively on said two fuse leads.

13. The electronic protection component of claim 11, wherein said alloy melting promoting agent is a resin.

* * * * *